July 16, 1968 C. E. HARTLEY 3,392,771
CREDIT CARD WALLET
Filed March 3, 1967
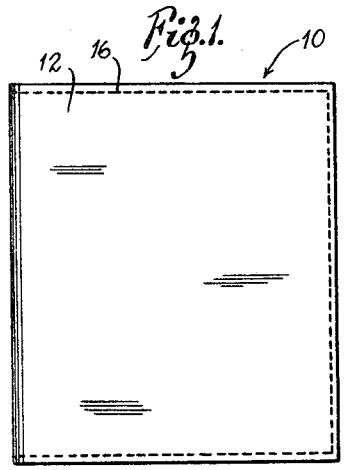
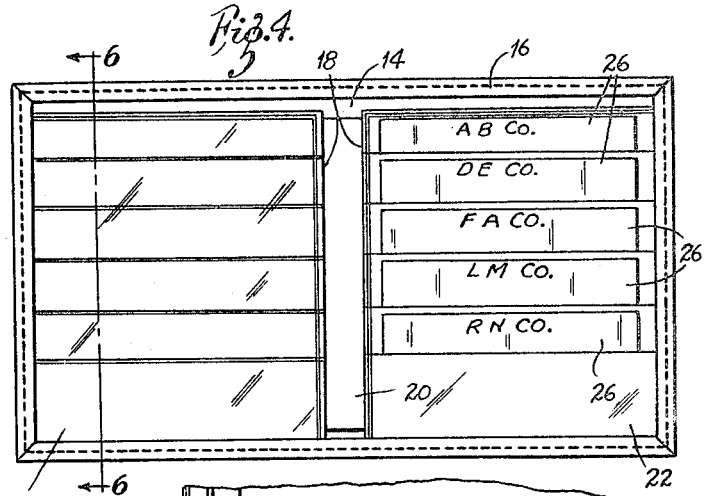
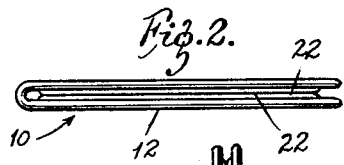
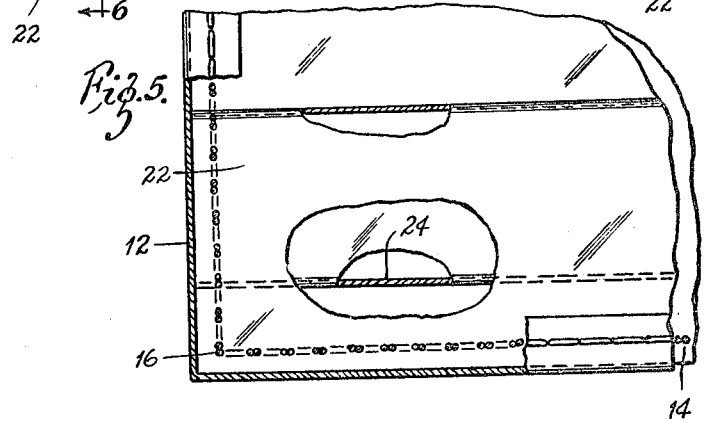
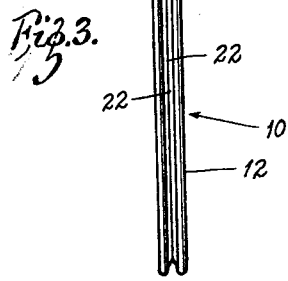
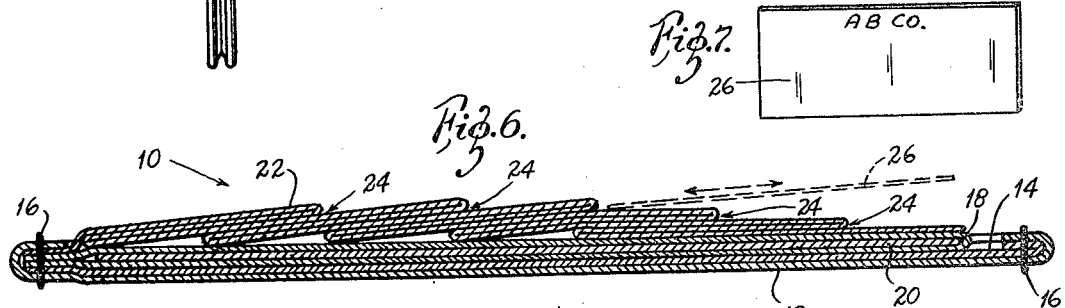
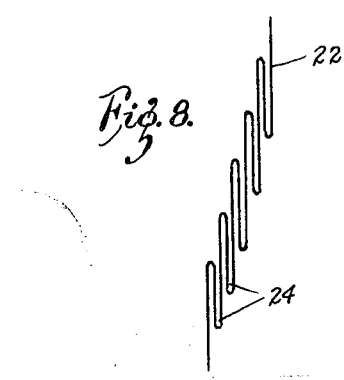
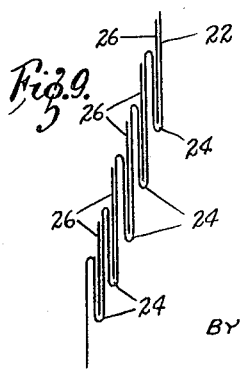
INVENTOR:
CHARLES E. HARTLEY
BY Kingsland, Rogers, Ezell, Eilers & Robbins
ATTORNEYS United States Patent Office 3,392,771
Patented July 16, 1968

3,392,771
CREDIT CARD WALLET
Charles E. Hartley, 3617 Imperial Gardens Drive,
St. Ann, Mo. 63074
Filed Mar. 3, 1967, Ser. No. 620,509
2 Claims. (Cl. 150—39)

ABSTRACT OF THE DISCLOSURE

A credit card wallet incorporating adjacent vertical rows of built-in credit card pockets, each row being formed from a single piece of material folded in stepped manner to produce the pockets and being stitched and sealed against removal, a separate currency pocket, and utility pockets.

Background of the invention (1) *Field of the invention.*—The present invention relates generally to the credit card wallet art, and more particularly to a novel built-in credit card wallet including rows of non-removable stepped pockets for credit cards.

(2) *Description of the prior art.*—Heretofore, there have been devised numerous combination credit card wallet structures, individual credit card structures of various types, such as the foldable accordion unit, the hinged unit, etc. However, the applicant is aware of no credit card wallet which satisfactorily fulfills the requirements of such an item, namely one of built-in type which will hold a sufficient number of credit cards in exposed fashion, yet will function well as a wallet.

Summary of the invention

In brief, the present novel built-in credit card wallet comprises a casing within which is permanently mounted one or more rows of overlapping credit card pockets, each formed from a single sheet of folded material. Also provided are a currency pocket and utility pockets.

Therefore, objects of the present invention are to provide a novel built-in credit card wallet which fulfills a long-felt need of a satisfactory unit having sufficient non-removable pockets for exposed credit cards and a space or pocket for currency, which is of simple and durable construction, which is neat in appearance, which can be readily employed for its intended purposes, and which otherwise fulfills the objects and advantages sought therefor.

The foregoing and other objects and advantages are apparent from the folowing description taken with the accompanying drawings.

Brief description of the drawings

FIGURE 1 is a view of a built-in credit card wallet incorporating the teachings of the present invention, illustrated in folded relation;

FIGURE 2 is a top plan view thereof;

FIGURE 3 is a front end view thereof;

FIGURE 4 is a view of the inside thereof, the wallet being open;

FIGURE 5 is an enlarged fragmentary view of the lower left-hand corner of FIGURE 4, parts being in section and parts broken away for illustration of detail;

FIGURE 6 is an enlarged cross-sectional view taken on substantially the line 6—6 of FIGURE 4 rotated ninety degrees for convenience of illustration;

FIGURE 7 is an isometric view of a credit card;

FIGURE 8 is a diagrammatic single line view illustrating the relationship of the pockets; and FIGURE 9 is a diagrammatic view similar to FIGURE 8, credit cards being disposed in the pockets.

Description of the preferred embodiment

Referring to the drawings more particularly by reference numerals, 10 indicates generally a built-in credit card wallet constructed in accordance with the teachings of the present invention. The credit card wallet 10 includes an outer casing or cover 12 of any suitable material, as leather, plastic, and the like. A lining 14 is disposed interiorly of the cover 12, as illustrated. The cover 12 is folded over interiorly about the lining 14 for its full perimeter, there being a continuous stitching 16 securing the same in place. A sheet 18 of plastic material is folded back upon itself and disposed in each half of the credit card wallet 10, being secured in place along the outer edges and the bottom edges by the stitching 16, as shown at the left in FIGURE 6. A single sheet 20 of material extends between the folds of the two sheets 18, thereby providing utility spaces at front and rear of the sheet 20. A sheet 22 of plastic is folded in stepped fashion, as clearly shown in FIGURES 4–6 and as indicated in FIGURES 8 and 9, and is disposed on each sheet 18 in overlaying relationship, being secured in place at the outer side and along the bottom by the stitching 16 and along the top and the inner side by heat sealing to the top and inner side of the sheet 18 in well-known manner. Five credit card pockets 24 are thus formed at each side of the credit card wallet 10. In FIGURE 4, credit cards 26 are shown disposed in the pockets 24. This same relationship is diagrammatically illustrated in FIGURES 8 and 9. It will be noted that the lowest pocket 24 is a little shallower than the other four pockets 24 thereabove, which is essential in order to utilize the full space available.

It is manifest that there has been provided a unique built-in credit card wallet in which each row of credit card pockets is formed from a single piece of material folded into the desired configuration and permanently positioned. Thereby, a neat, compact serviceable unit for both credit cards and currency is provided. It is clear, of course, that the configuration of the present credit card wallet can be modified as required or desired, and that materials may be selected as desired.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, a credit card wallet comprising a casing including two sections foldable together, a compartment for paper money and the like, at least one row of overlapping pockets for credit cards, and the like, mounted in the casing outside of said compartment and formed from a single piece of material folded as steps to provide a plurality of pockets, each pocket adapted to hold a credit card, and the like, for ready identification and removal, said folded material being secured along the sides and bottom to maintain the pockets secure in position and of desired configuration.

2. The combination of claim 1 in which there are two rows of overlapping pockets, the folded material of each pocket being free of connection with said casing along the upper and the inner edges, said rows of pockets being in facing contiguous relationship when said wallet is folded.

References Cited

UNITED STATES PATENTS

| | | |
|---|---|---|
| 2,871,153 | 1/1959 | Copen. |
| 3,227,471 | 1/1966 | Conniker _____ 281—31 |
| 1,787,054 | 1281930 | Scheuer. |
| 2,452,096 | 10/1948 | Bertalotto _____ 150—35 |
| 3,187,903 | 6/1965 | Oltz _____ 150—1 |

DAVID M. BOCKENEK, *Primary Examiner.*